United States Patent [19]

Gardner et al.

[11] Patent Number: 5,769,604
[45] Date of Patent: Jun. 23, 1998

[54] FACE SEAL DEVICE HAVING HIGH ANGULAR COMPLIANCE

[75] Inventors: James F. Gardner; Matthew D. Cunningham, both of Cranston, R.I.

[73] Assignee: EG&G Sealol, Inc., Cranston, R.I.

[21] Appl. No.: 434,537

[22] Filed: May 4, 1995

[51] Int. Cl.$^6$ .................................................. F04D 29/08
[52] U.S. Cl. ........................................... 415/170.1; 277/74
[58] Field of Search .......................... 415/170.1; 277/74, 277/96.1

[56] References Cited

U.S. PATENT DOCUMENTS

| | | | |
|---|---|---|---|
| 3,499,653 | 3/1970 | Gardner | 277/27 |
| 3,675,935 | 7/1972 | Ludwig et al. | 277/74 |
| 3,804,424 | 4/1974 | Gardner | 277/74 |
| 4,523,764 | 6/1985 | Albers et al. | 277/74 |
| 4,645,414 | 2/1987 | DeHart et al. | 415/170.1 |
| 5,039,113 | 8/1991 | Gardner | 277/81 |
| 5,052,694 | 10/1991 | Lipschitz | 277/74 |
| 5,143,384 | 9/1992 | Lipschitz | 277/96.1 |
| 5,311,734 | 5/1994 | Pope et al. | 60/39.02 |

FOREIGN PATENT DOCUMENTS

2 385 013  10/1978  France .
38 19566  12/1989  Germany .

*Primary Examiner*—John T. Kwon
*Attorney, Agent, or Firm*—Finnegan, Henderson, Farabow, Garrett & Dunner, L.L.P.

[57] ABSTRACT

A rotary seal assembly for preventing leakage of a fluid from a region of high pressure in a housing to a region of relatively lower pressure includes a first member mounted within the housing and having a central axis and an annular sealing face extending in a direction substantially radial the central axis, and a second member located in the housing and having an annular sealing face extending in a direction substantially radial to the central axis and opposing the first member sealing face. The second member sealing face has a first set of grooves and a second set of grooves arranged circularly therebout, the second set of grooves being spaced radially inward of the first set of grooves. One of the first and second members is a rotor and the other is a stator. A stator holding assembly supports the stator within the housing, the rotor being rotatable about the central axis. The stator holding assembly secures the stator against rotation and urges the stator sealing face toward the rotor sealing face. Pressurized fluid flows between the sealing faces and within the first and second set of grooves, thereby forming a gas film seal between the sealing faces.

33 Claims, 9 Drawing Sheets

FACE SEAL DEVICE HAVING HIGH ANGULAR COMPLIANCE

BACKGROUND OF THE INVENTION

1. Field of the Invention

The present invention relates to gas seals and, more specifically, to compliant, noncontacting gas seals for sealing high pressure areas from low pressure areas.

2. Description of the Related Art

Many classes of machinery use noncontacting (clearance) seals to contain a gas under pressure. Often these seals are simple labyrinth seals which break down pressure by using a series of teeth or blades in close proximity to a rotating shaft. Such devices are well known and reliable, but allow high rates of gas leakage. Typically, clearances between the blade tips of a labyrinth seal and the shaft are as high as 0.001–0.002 inches per inch of shaft diameter.

Much work has been done to reduce the leakage of labyrinth seals. Typically, the approach of past efforts has been directed toward improved blade geometry (e.g., backward angled blade designs), step seals, or interlocking blade designs to reduce losses. Abradable labyrinth seal designs have also been developed and are employed, particularly, on jet engines. The blades of such abradable seals are initially installed with a line-to-line clearance, and then wear in to their own clearance as the machine rotates. However, after the rotor has gone through an operating history of radial vibration combined with axial excursions, a crescent-shaped clearance is often cut into the abradable seal, and leakage can increase dramatically. In spite of many improved designs, therefore, leakage losses for labyrinth seals continue to represent a considerable energy loss.

Another significant problem with high pressure labyrinth seals is the occurrence of rotordynamic effects. Since high pressure gas is quite dense, a labyrinth seal begins to act as a bearing with high gas pressures, but tends to destabilize the rotor due to a lack of concentricity with the actual machine bearings. Significant effort has been made recently to decrease rotordynamic excitation effects. The product of these efforts includes swirl breaks in front of a labyrinth, reverse swirl inducers, and injecting tangentially, noncircumferentially-moving gas into the first stagnant region of the labyrinth. Other work has been concentrated on optimized geometry and creating a rough surface within the labyrinth seal to retard circumferential gas velocity buildup. Also, honeycomb design labyrinth seals have been developed to reduce rotordynamic excitation effects. However, further reduction of rotordynamic effects is desired for applications such as jet engines.

Another type of noncontacting seal that has been developed is a gas lubricated face seal. One of the first working examples of such a face seal was disclosed in U.S. Pat. No. 3,499,653 to Gardner. In that seal, the relatively rotatable sealing members are kept from touching one another during operation, thereby reducing wear on the sealing members and heat build up due to friction. A pressurized gas film is created between the seal member faces to separate them. The gas film is formed by set of shallow spiral grooves cut into the outer periphery of the sealing face of one of the seal members. During relative rotation of the seal members, the grooves cause gas to be forced (pumped) inward with sufficient pressure to separate the seal member faces enough to form the sealing film layer.

Gas face seals of this type have been successfully utilized in applications where the size of the seal ranged from a 1.5 inch shaft diameter up to a 15.0 inch seal outer diameter. Operating pressures of up to 1500 psid, operating speeds of up to 500 ft/sec, and operating temperatures of up to 400° F. have been achieved in face seals used for centrifugal gas compressors. Such seals may have leakage of about 1 scfm or less, and operate with gas films as thin as 0.080–0.150 mils, with a stiffness of 7–10 lbf/µin. In such seals, the deflection of the rotor face from a position parallel to the stator sealing face is typically as much as 0.100–0.300 mils.

Importantly, to successfully operate such a seal, the seal faces must be maintained substantially parallel to each other along their entire sealing areas as the rotor moves and deforms under the influence of various forces. If the sealing faces move apart too much even at only one radial portion of the seal, unacceptable levels of leakage will occur. If the sealing faces move together, they may contact each other and undesirably wear, also leading to leakage. Thus, the stator sealing face must be able to follow the deflections of the rotor face while maintaining film thickness.

Factors which could cause the rotor sealing face to deflect include centrifugal forces caused by the rotor's rotation, radial excursions, and thermal deflections. Thermal deflections can be extremely large in large diameter seals because the thermal energy that flows into the seal face is proportional to the square of the angular speed of the rotor, and is proportional to the fourth power of the seal radius. Further, simply because the radius of a rotor is larger, the deflections at the outer surface of the rotor sealing face will be proportionally larger for a given angle of deflection. Also, in hotter environments, sealing members must be made of suitable high temperature alloys or ceramics rather than lower temperature materials (such as carbon graphite) whose physical properties are limited in such an application. However, metals are generally more subject to thermal expansion leading to more deflection and coning of the rotor surface.

While the type of seal disclosed in the above patent worked well in its intended environment, the seal members are not compliant or responsive enough to be utilized in larger environments such as jet engine compressor discharges, preswirlers, or rear thrusters, where labyrinth seals are now commonly used. In these locations, rotor surface speeds may be approximately 1000 ft/sec, and temperatures may exceed 1000° F., leading to greater rotor sealing face movement from the parallel position in the range of about 3 mils.

SUMMARY OF THE INVENTION

Features and advantages of the invention will be set forth in part in the description which follows, and in part will be obvious from the description, or may be learned by practice of the invention. The objects and other advantages of the invention may be realized and attained by the apparatus particularly pointed out in the written description, claims and appended drawings.

To achieve these and other advantages, and in accordance with the purposes of the invention as embodied and broadly described herein, a stator is provided for use in a rotary seal assembly. The stator includes an annular member defining a central axis, and a sealing face located on the annular member and extending in a direction substantially radial to the central axis. A first set of grooves is arranged circularly about the sealing face, and a second set of grooves is arranged circularly about the sealing face and spaced radially inward of the first set of grooves.

In one aspect of the invention, a noncontacting face seal interface is provided, comprising an annular first member defining a central axis and having a sealing face extending in a direction substantially radial to the central axis, the sealing face being locally deformable during rotation of the first member. A flexible annular second member is also provided coaxial with the first member and having a sealing face extending in a direction substantially radial to the central axis and opposing and substantially parallel to the first member sealing face. The seal interface also includes means for creating a first annular high pressure area acting on the second member sealing face, and means for creating a second annular high pressure area acting on the second member sealing face radially inward of the first high pressure area. One of the first and second members is a rotor and the other is a stator, the rotor being rotatable about the central axis. The deformation of the rotor along a given radius alters the pressure distribution within the first and second high pressure areas along the given radius to thereby correspondingly deform the stator so that the stator sealing face remains substantially parallel to the rotor sealing face at each point along the given radius.

In accordance with another aspect of the invention, a rotary seal assembly for preventing leakage of a fluid from a region of high pressure in a housing to a region of relatively lower pressure is provided. The assembly comprises a first member mounted within the housing and having a central axis and an annular sealing face extending in a direction substantially radial to the central axis, and a second member located in the housing and having an annular sealing face extending in a direction substantially radial to the central axis and opposing the first member sealing face. The second member sealing face has a first set of grooves and a second set of grooves arranged circularly thereabout, the second set of grooves being spaced radially inward of the first set of grooves. One of the first and second members is a rotor and the other is a stator, the rotor being rotatable about the central axis. A stator holding assembly supports the stator within the housing, the stator holding assembly securing the stator against rotation and urging the stator sealing face toward the rotor sealing face. Pressurized fluid flows between the sealing faces and within the first and second set of grooves, thereby forming a gas film seal between the sealing faces.

Preferably, the second member sealing face further includes a first dam region located radially inward of the first set of grooves and a second dam region located radially inward of the second set of grooves. The second member sealing face may also preferably include a fluid drain located radially inward of the first set of grooves for draining fluid from between the sealing faces, a fluid feed located radially inward of the fluid drain for feeding fluid to between the sealing faces, and a dam region located on the second member sealing face between the fluid drain and the fluid feed.

It is to be understood that both the foregoing general description and the following detailed description are exemplary and explanatory and are intended to provide further explanation of the true scope of the invention, which is set forth in the appended claims.

BRIEF DESCRIPTION OF THE DRAWINGS

The accompanying drawings, which are included to provide a further understanding of the invention and are incorporated in and constitute a part of the specification, illustrate several embodiments of the invention and together with the description serve to explain the principles of the invention. In the drawings.

DETAILED DESCRIPTION OF THE INVENTION

Reference will now be made in detail to the presently preferred embodiments of the invention, as illustrated in the accompanying drawings, in which like reference characters designate like or corresponding parts throughout the several drawings.

Figure 1:
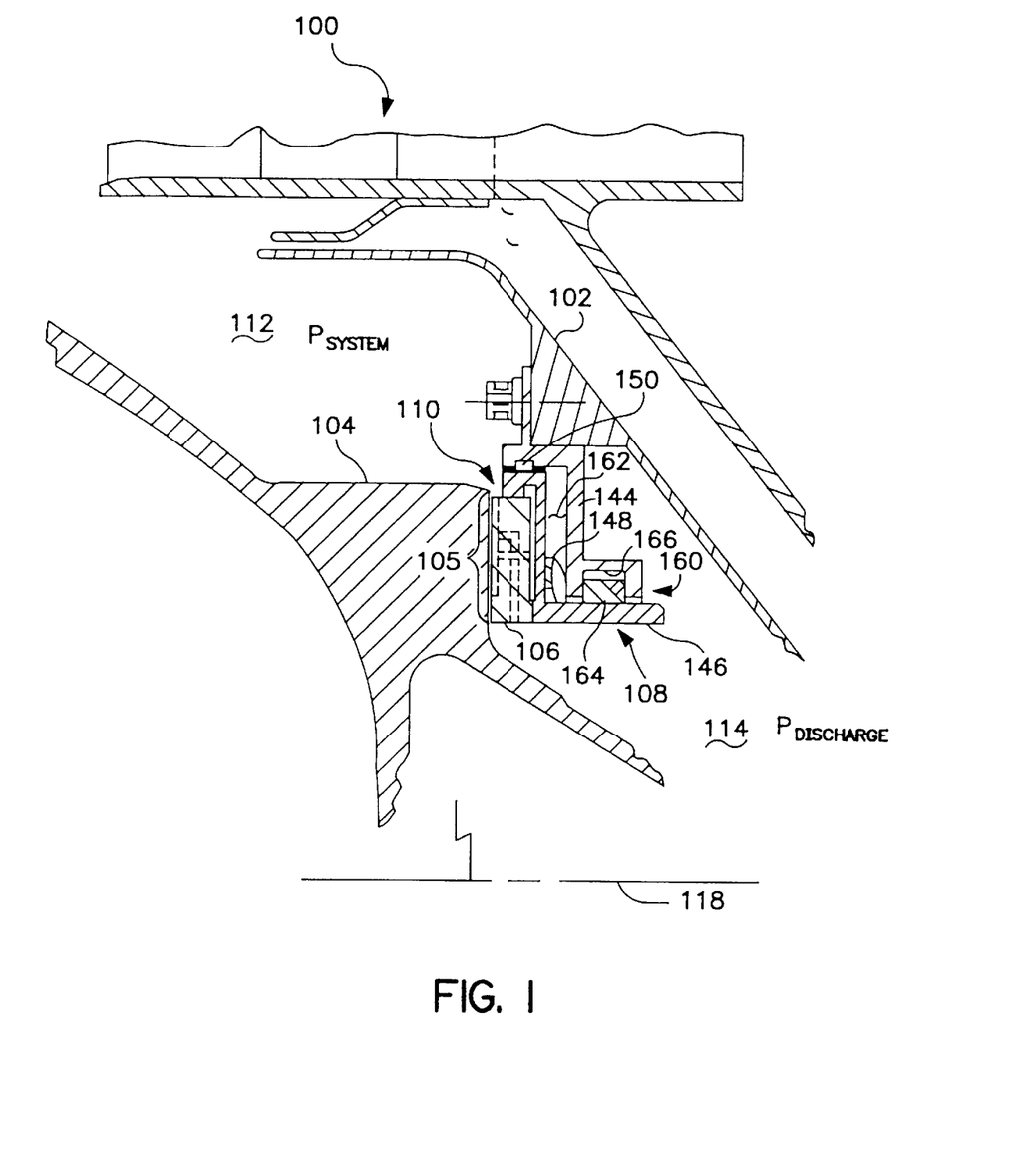
FIG. 1 is a sectional view of a seal assembly including a stator according to first embodiment of the invention, wherein the secondary seal is a piston ring.

A first embodiment of the invention will now be described with reference to FIGS. 1–13. As shown in FIG. 1, a seal assembly 100 includes a housing 102 in which two sealing members, a rotor 104 and a stator 106, are mounted. The stator 106 is secured to the housing 102 by a stator holding assembly 108. It should be understood that the housing 102, rotor 104, stator 106, and stator holding assembly 108 are annular, and FIG. 1 and other similar figures show only the top portions of these elements. It is expected that the stator 106 may have an outer diameter of as large as 20 inches or more, within the scope of the invention.

As shown in FIG. 1, the rotor 104 is mounted within the housing 102 for rotation about a central axis 118. The rotor 104 has an annular sealing face 105 that extends in a direction substantially radial to the central axis 118. The rotor sealing face 105 is preferably lapped to a tolerance of about 10–15 $\mu$in, if possible, but tolerances in the order of magnitude of about 100 $\mu$in are acceptable, especially in applications such as that shown in FIG. 1 when the rotor sealing face 105 is ground directly into a rotating machinery element. The rotor 104 and stator 106 oppose each other at a seal interface 110 that separates a region 112 of high pressure ($P_{system}$) within the housing 102 from a region 114 of relatively lower pressure ($P_{discharge}$).

Figure 2:
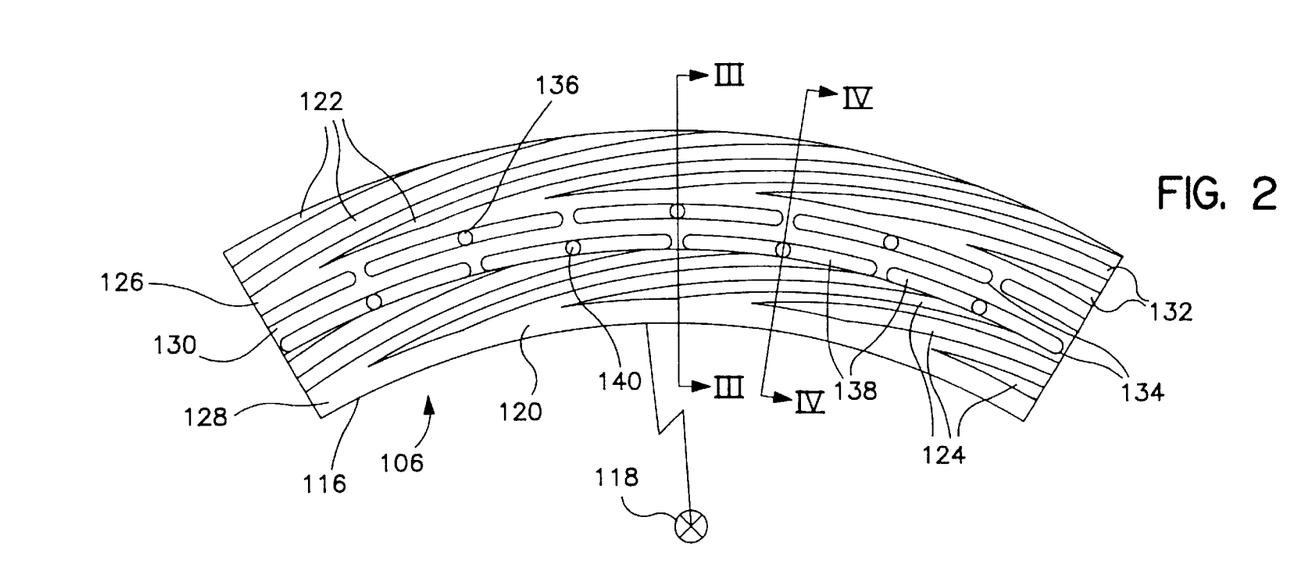
FIG. 2 is a partial front view of a sealing face of the stator of FIG. 1.

In accordance with the first embodiment of the invention, as shown in FIG. 2, the stator 106 includes an annular member 116 defining a central axis 118, and a sealing face 120 located on the annular member and extending in a direction substantially radial to the central axis. The stator sealing face 120 extends from the inner diameter of the annular member 116 to its outer diameter. The rotor sealing face 105 preferably extends beyond the stator sealing face 120 at the annular member inner and outer diameters enough to account for radial run out and excursions. This extra distance is generally in the range of 1/16 of an inch at either diameter.

Preferably, the stator 106 is manufactured of a flexible metallic material such as Inconel 718. This material is especially desirable if the stator 106 is to be used in an environment where the temperature may exceed 1000° F. The stator sealing face 120 should be ground to a tolerance of about ±0.0002 inches to ensure proper sealing, and a thin tribological coating such as that disclosed in U.S. patent application Ser. No. 08/376,116, filed Jan. 20, 1995, owned by applicants' assignee and incorporated by reference herein, may be employed to reduce friction.

To ensure proper flexibility, the thickness of the stator should be minimized, but not beyond the point that the axisymmetric angular stiffness of the stator can accomodate the rotor deflections present in a given application. Larger aerospace applications may require a stiffness of about one-fifth that of prior art industrial applications, therefore requiring a thinner stator than used previously. For example, Applicants envision that, for a 9.6 inch outer diameter stator having a 7.7 inch inner diameter, the thickness should be approximately 0.200 inches to ensure necessary flexibility.

A shown in FIG. 2, a first set of grooves 122 is disposed circularly about the sealing face 120. A second set of grooves 124 is also disposed circularly about the stator sealing face 120, and is spaced radially inward of the first set of grooves 122. The grooves 122 and 124 preferably are arcuate and are spirally arranged about the central axis 118. Thus, none of the grooves 122 or 124 is coaxial with the annular member 116. The ends of the grooves 122 and 124 are preferably spaced 7°–20° from each other around the central axis 118 of the stator 106.

For the 9.6 inch stator discussed above, each set of grooves includes sixteen equally-spaced grooves, each 22.5° degrees from the adjacent two grooves. The radius of curvature of each of the outer grooves 122 is about 4.7 inches, and the radius of curvature of each of the inner grooves 124 is about 4.1 inches. Preferably, each of grooves 122 and 124 has a depth of about 0.0003–0.0010 inches, most preferably about 0.0005 inches.

As shown in FIG. 2, the stator 106 further includes a plurality of dam regions. A first dam region 126 is located on the sealing face 106 radially inward of the first set of grooves 122, and a second dam region 128 is located on the sealing face radially inward of the second set of grooves 124. The dam regions 126 and 128 cooperate with the respective grooves 122 and 124 to form the thin fluid film between the rotor 104 and stator 106 during operation of the seal assembly 100, as will be described below. The first set of grooves 122 and the first dam region 126 thus operate to create an annular high pressure area acting on the stator sealing face 120, and the second set of grooves 124 and the second dam region 128 operate to create a second annular high pressure area acting on the stator sealing face radially inward of the first high pressure area. As will be discussed below, the grooves 122 and 124 may alternately be radially extending. The dam regions 126 and 128 are part of the smooth stator sealing face 120, and are not recessed as are the grooves 122 and 124.

Figure 3:
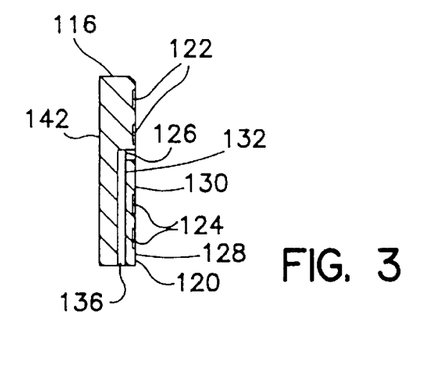
FIG. 3 is a sectional view of the stator taken along line III—III of FIG. 2.
Figure 4:
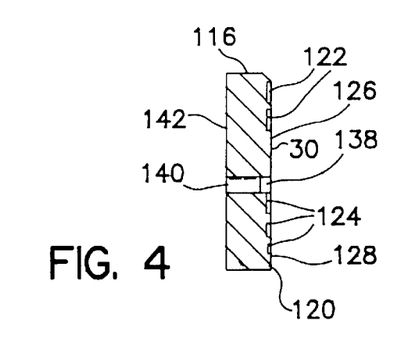
FIG. 4 is a sectional view of the stator taken along line IV—IV of FIG. 2.

As shown in FIGS. 2–4, a fluid drain communicates with the stator sealing face 120 radially inward of the first set of grooves 122. Preferably, the fluid drain includes a plurality of arcuate drain pockets 132 spaced about the stator sealing face 120. Circumferential flow breaks 134 are provided between the arcuate drain pockets 132 to ensure that each pocket acts independently of the other pockets to drain fluid from the stator sealing face 120. The independent action of the drain pockets 132 allows different portions of the annular member 116 to react separately during operation of the seal assembly 100, thereby improving seal compliance.

Each drain pocket 132 communicates with a drain conduit 136 passing through the annular member 116 to the radially inner surface of the annular member to reach the low pressure region 114. The drain pockets 132 and drain conduits 136 are sized so as to allow nonrestrictive flow from the stator sealing face 120 to the low pressure region 114. Preferably, for a stator having a 9.6 inch outer diameter, twenty-four drain pockets 132 are provided, each about 0.020 inches deep and 0.062 inches wide, and the drain conduits 136 have a diameter of about 0.070 inches. Of course, these specific dimensions, as well as others given above, will vary depending on the stator size and the particular application.

As shown in FIGS. 2–4, a fluid feed communicates with the stator sealing face 120 radially inward of the first set of grooves 122. Preferably, the fluid feed includes a plurality of arcuate pockets 138 spaced about the stator sealing face 120 radially inward of the arcuate pockets 132 of the fluid drain. The cross-sections of the fluid feed pockets 138 are sized similar to those of the fluid drain pockets 132, and flow breaks 134 are similarly disposed between the fluid feed pockets to provide independent action.

Each feed pocket 138 is in communication with a feed conduit 140 extending from the pocket through the annular member 116 to communicate with the high pressure region 112. As shown in FIG. 4, the feed conduit 140 passes straight though the annular member 116, exiting it on a lapped static sealing face 142 opposite the stator sealing face 120. Alternately, the feed conduit (referred to by reference numeral 240 in FIG. 18) extends radially outward through the annular member 116 to its radially outer surface. Depending on the particular application, the diameter of the feed conduits 140 may be sized so as to be either restrictive or nonrestrictive, depending on the magnitude of $P_{system}$, and depending on the particular application.

As shown in FIGS. 2–4, a third dam region 130 is located on the stator sealing face 120 between the fluid drain and the fluid feed. The third dam region 130 reduces (but does not preclude) flow directly from the feed pockets 138 to the drain pockets 132, and allows the pockets 132 and 138 to operate substantially independently from each other, thereby allowing both sets of grooves and dams 122 and 126, and 124 and 128, respectively, to operate relatively independently of each other.

The length of the grooves 122 and 124, and the width of the dam regions 126, 128, and 130 in the radial direction should be designed so that the zero net moment is achieved relative to the stator sealing face 120 when the rotor 104 is undeflected, and these dimensions can be varied for different applications. In the 9.6 inch outer diameter stator discussed previously, the both sets of grooves 122 and 124 have a radial length of about 0.52 inches, and the dam regions 126, 128, and 130 have a radial thickness of about 0.10 inches.

It should be understood that, while FIGS. 1–4 show the grooves 122 and 124, dam regions 126, 128 and 130, and the fluid feed and drain as being disposed on the stator sealing face 120, in some applications they could be disposed on the rotor sealing face 105. Thus, these elements may be disposed on either one of the two sealing members, within the scope of the invention. It is expected that placement of these elements on the rotor would be easier in an application such as FIG. 19, discussed below, where the rotor 304 is separately mounted on the rotating machinery, rather than an integral part of the rotating machinery.

Figure 5:
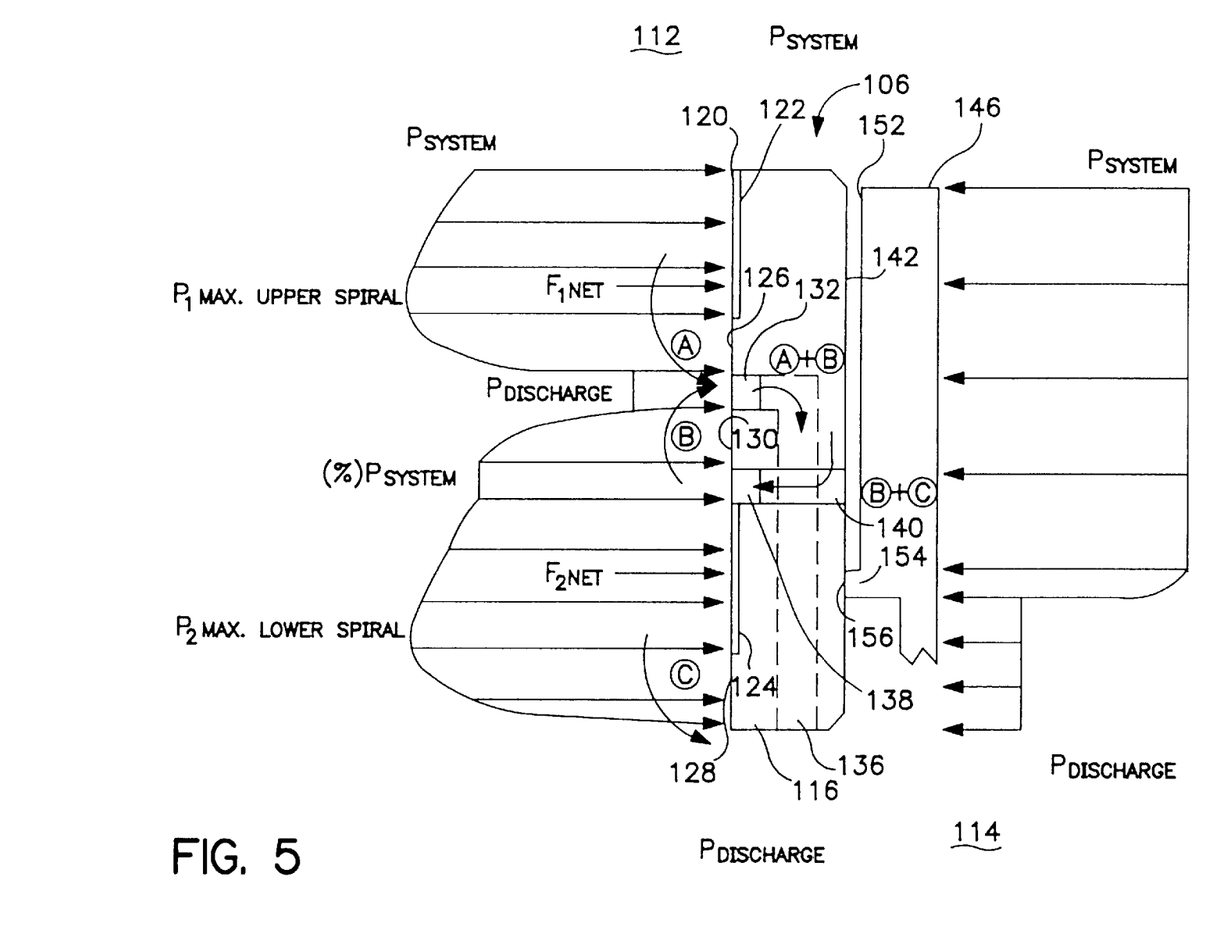
FIG. 5 is a diagrammatical side view of the fluid flow and pressure distribution about the stator.

FIG. 5 shows the fluid flow and pressure distribution around the stator 106. Flow portion "A" travels from high pressure region 112 at the outer diameter of the annular member 116, radially inward across and through the first set of grooves 122, across the first dam region 126, into a drain pocket 132, and out a drain conduit 136 to the low pressure region 114. Flow portions "B" and "C" initially start out together at the high pressure region 112, and travel though a feed conduit 140 and out a feed pocket 138 before dividing apart. Flow portion "B" then moves radially outward across the third dam region 130 and joins flow portion "A" passing into a drain pocket 132. However, flow portion "C" moves radially inward across and through the second set of grooves 124, across the second dam region 128, past the inner diameter of the annular member 116 to the low pressure region 114. Flow portion "C" is typically larger than flow portion "B," since the second set of grooves 124 is pumping fluid inward. Thus, all of the flow portions "A"–"C" pass from the high pressure region 112 to the low pressure region 114 via different, although somewhat overlapping, routes.

FIG. 5 also shows a typical axial pressure distribution acting on the stator 106 during operation. At the outer diameter of the stator 106 (the top, as shown in FIG. 5), $P_{system}$ acts on the stator sealing face 120. Moving inward down the stator sealing face 120, the pressure acting on the stator sealing face increases to a first $P_{1maximum}$ located at about the point where the first set of grooves 122 ends and the first dam region 126 begins. The pressure across the first dam region 126 drops to $P_{discharge}$ across the drain pockets 132. The pressure across the second dam region 128 increases to either $P_{system}$ if the fluid feed includes nonrestrictively sized feed conduits 140 or a percentage of $P_{system}$ if the feed conduits are restrictive. Moving further inward, the pressure on the stator sealing face 120 increases again to a second $P_{2maximum}$ at about the point where the second set of grooves 124 ends and the second dam region 128 begins. The pressure then drops to $P_{discharge}$ across the second dam region 128. Thus, two annular areas of high pressure act on the stator sealing face 120 having centers of pressure located a $F_{1net}$ and $F_{2net}$. It should be understood that the two $P_{maximums}$ and $F_{nets}$ are not necessarily equal.

A varying pressure distribution also acts on the lapped static sealing face 142 of the stator 106. As shown in FIG. 5, from the chamfer at the outer diameter of the stator 106, $P_{system}$ acts on the lapped static sealing face 142 inwardly past the feed conduit 140 to the protrusion 154 extending from the stator holder 146 of the stator holding assembly 108, which will be described below. The pressure drops across the protrusion 154 down to $P_{discharge}$, which is active on the lapped static sealing face 142 down to the inner diameter of the annular member 116.

As shown in FIG. 1, the stator holding assembly 108 includes a stator bracket 144 fixedly secured to the housing 102, and a stator holder 146 slidably secured to the stator bracket. Both the stator bracket 144 and the stator holder 146 are annular in shape. At least one pin 145 may be provided extending from the stator bracket 144 to be slidably received in a half circle slot at the outer diameter of the stator holder 146 to prevent the stator holder (and thus the stator 106) from rotating. (See FIG. 19)

Figure 19:
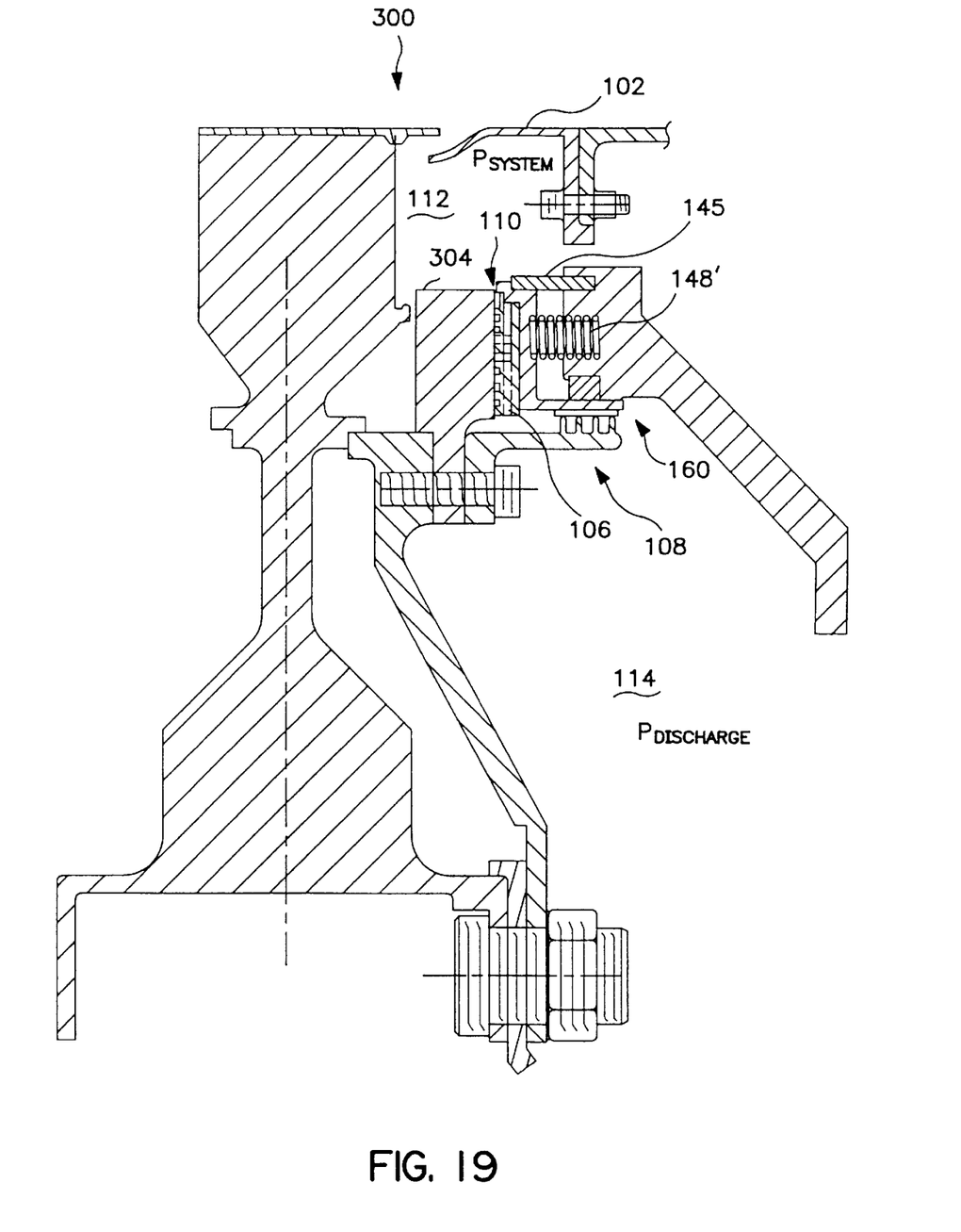
FIG. 19 is a sectional view of an alternate seal assembly to that of in FIG. 1.

Preferably, a spring 148 is provided between the stator bracket 144 and the stator holder 146 to urge the stator holder (and thus the stator 106) toward the rotor 104. As shown in FIG. 1, the spring 148 may comprise a wave spring. Alternately, as shown in FIG. 19, the spring 148' may be a coil spring. The spring 148 or 148' provides a force on the stator 106 acting opposite the pressure forces on the stator sealing face 120, thereby helping create the proper force balance to allow the desired thin film to form across the stator sealing face. The spring 148 or 148' also allows the stator 106 to move along with the rotor 104 if the rotor moves an unusually large distance for some reason, thereby preventing damage to the seal assembly 100. A plurality of radial spring segments 150 are disposed between the stator holder 146 and the stator bracket 144 to act as vibration dampers between these two elements.

Preferably, as shown best in FIG. 5, the stator has a lapped static sealing face 142 opposite the stator sealing face 120, and the stator holder 146 has a first surface 152 opposing the lapped static sealing face 142. At least one protrusion 154 extends from the first surface 152 of the stator holder 146. Preferably, the protrusion 154 is an annular ridge having a lapped surface 156 extending around the first surface 152 and contacting the stator lapped sealing face 142. The lapped surface 156 and the stator lapped sealing face 142 form a lapped static seal therebetween through which negligible leakage occurs, even when the stator is deflected by the rotor 104. The lapped surfaces 156 and 142 should be smooth to within about 0.00001 inches, and may also include a tribological coating.

As shown in FIG. 1, the stator holding assembly 108 includes a secondary seal 160 for preventing leakage of the fluid from the high pressure region 112 to the lower pressure region 114. Since there is no seal adjacent the radial spring segments 150 disposed around the perimeter of the stator holder 146, the region 162 between the stator holder 146 and the stator bracket 144 holding the spring 148 is subject to $P_{system}$. It is desirable to allow the system pressure to be active on both sides of the radially extending portion of the stator holder 146 so that it will be essentially force-balanced in the radial direction, thereby reducing the spring force from spring 148 required to urge the stator holder and stator 106 toward the rotor 104. A secondary seal 160 is thus required to prevent the high pressure fluid in the region 162 from leakage to the lower pressure area 114.

The secondary seal 160 must be able to accommodate thermal growth of the stator bracket 144, and must be able to accommodate axial motion of the seal ring holder 146. The secondary seal 160 must thus be capable of handling some movement in both the radial and axial directions while developing a small resisting force so that dynamic tracking of the stator sealing face 120 on the rotor 104 is not adversely affected.

As shown in FIG. 1, the secondary seal 160 is preferably a piston ring 164 coaxial with the central axis and located between the stator holder 146 and the stator bracket 144. The piston ring 164 is disposed within an annular cavity 166 within the stator holder 146.

Figure 6:
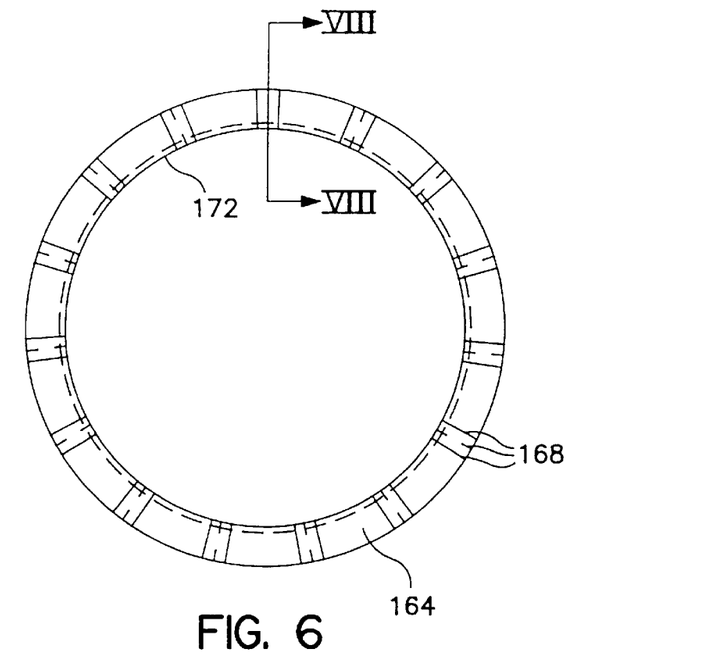
FIG. 6 is a front view of a spring piston ring for use in the seal assembly of FIG. 1.
Figure 7:
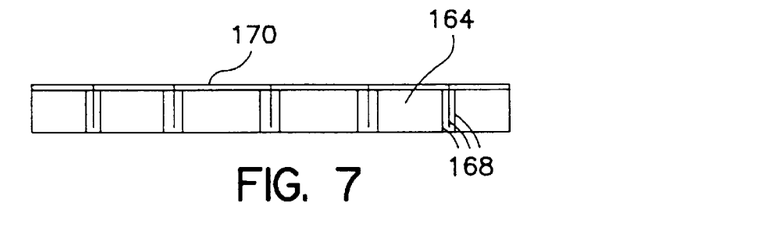
FIG. 7 is a side view of the spring piston ring of FIG. 6.
Figure 8:
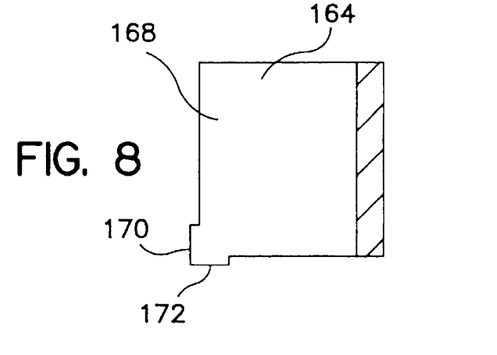
FIG. 8 is a sectional view of the spring piston ring taken along line XIII—XIII of FIG. 6.

More preferably, as shown in FIGS. 6–8, the piston ring 164 is a spring piston ring having at least one slot 168 extending partially through the ring in the direction of the central axis 118. Sets of three slots 166 may be provided about the piston ring 164 to provide circumferential flexibility, which accommodates thermal growth of the stator holder 146. The piston ring 164 is preferably made of 718 Inconel.

In order to ensure small resisting forces, the piston ring 164 may include an axial dam 170 and a radial dam 172. The axial dam 170 extends axially from the piston ring 164 to contact the downstream side of the cavity 166. The axial dam 170 thus allows pressurized fluid to act on the downstream side of the piston ring 164 balancing the axial force acting on the piston ring. The radial dam 172 extends radially from the piston ring 164 to contact the stator holder 146 at the downstream side of the piston ring. The radial dam 172 thus allows pressurized fluid to act on the radially inner side of the piston ring 164 balancing the radial force acting on the piston ring. The dimensions of both dams 170 and 172 should be such that, for the particular application, leakage is prevented while still allowing the stator 106 to satisfactorily perform dynamic tracking of the rotor 104.

While applicants have determined that a spring piston ring performs well as the secondary seal 160, other secondary seal options are available within the scope of the present invention. For example, the piston ring 164 may comprise an expansion type piston ring having a single slot extending all the way through the ring.

Figure 9:
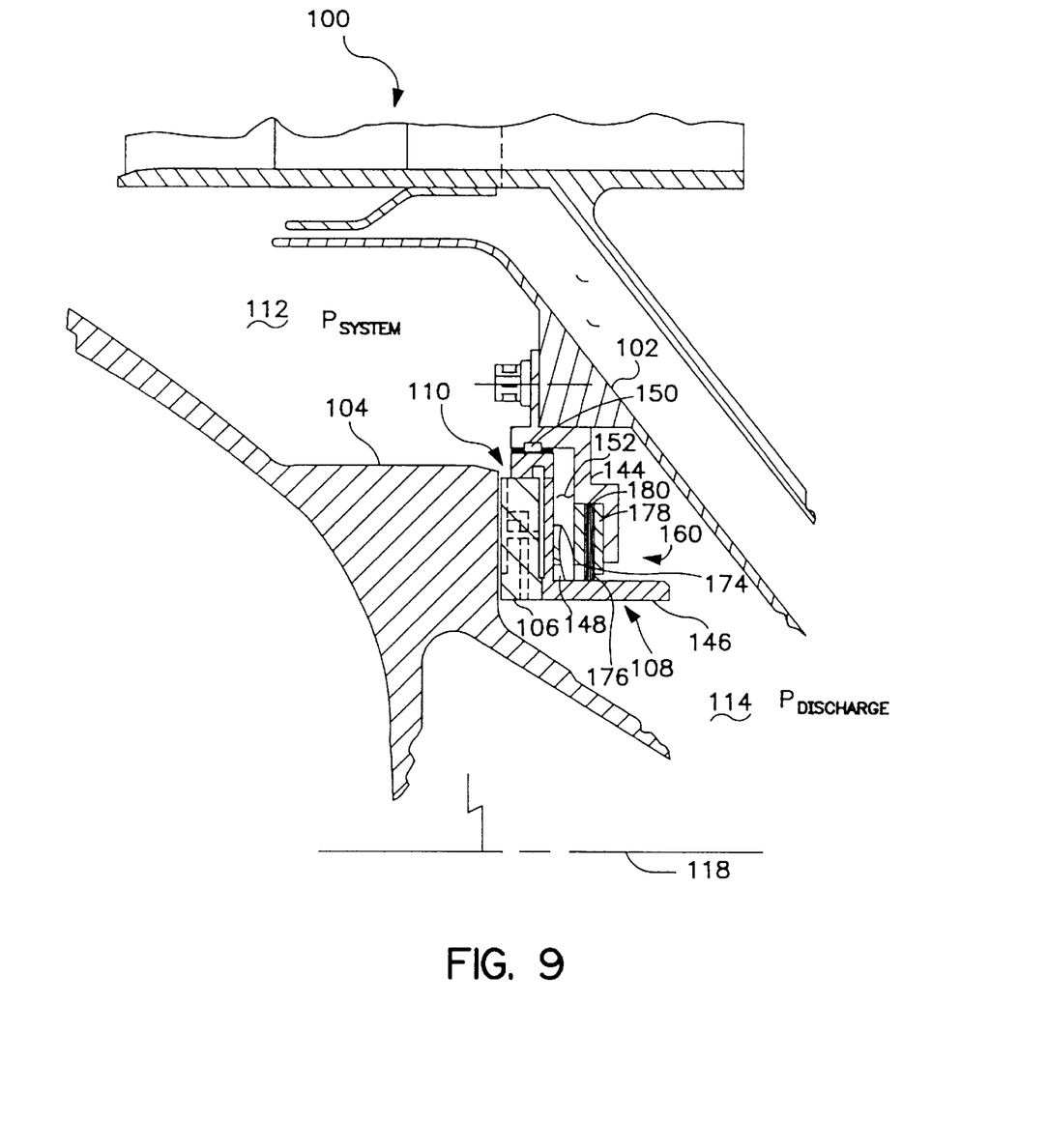
FIG. 9 is a sectional view of a seal assembly as in FIG. 1, wherein the secondary seal is a brush seal.

Alternately, as shown in FIG. 9, the secondary seal 160 may comprise a brush seal 174 including a plurality of substantially radially-extending, thin wire bristles 176 sandwiched between two annular metal plates 178 and 180. The bristles 176 are offset slightly from the radial direction and have a suitable stiffness so that the ability of the stator 106 to dynamically track the rotor 104 is not adversely affected.

Figure 10:
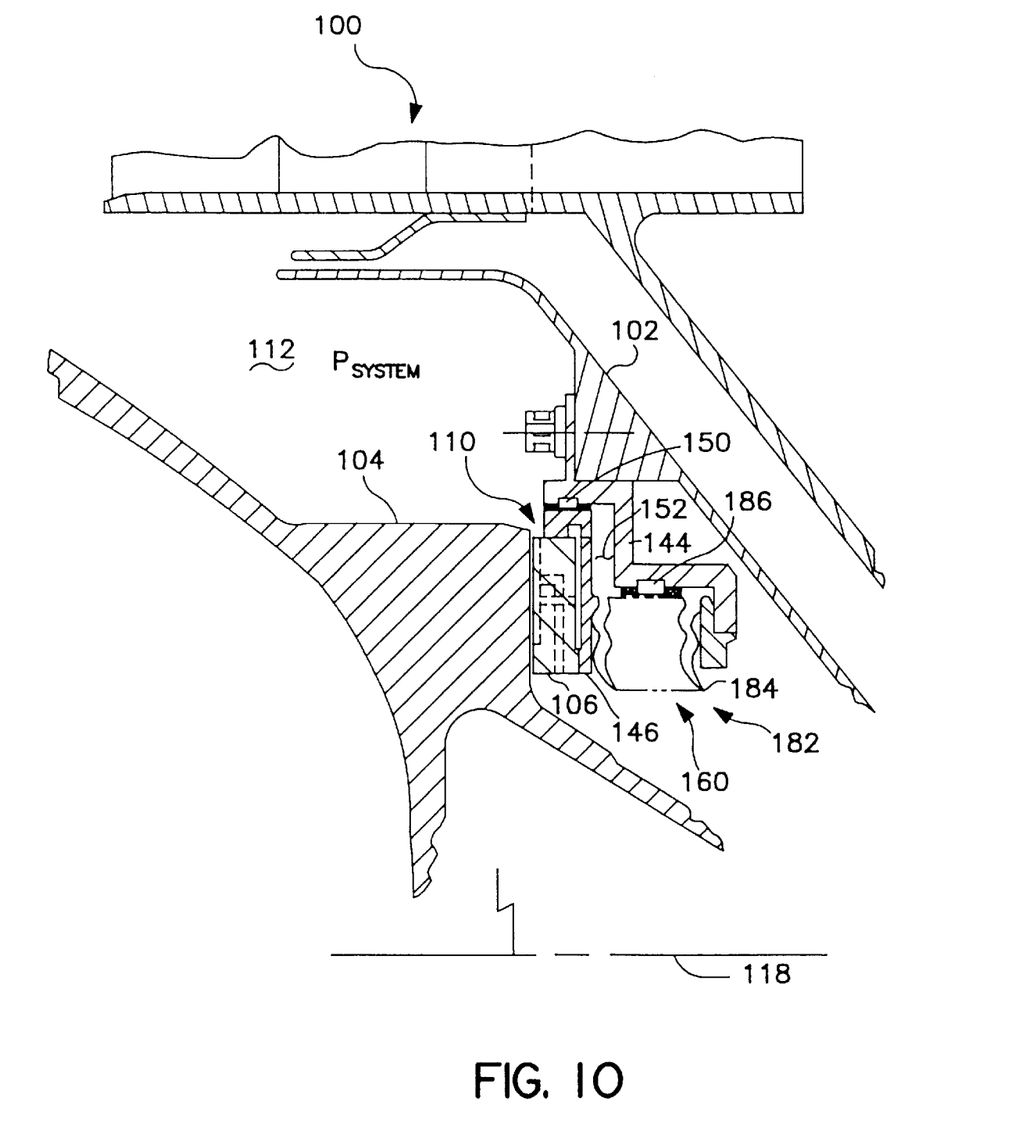
FIG. 10 is a sectional view of a seal assembly as in FIG. 1, wherein the secondary seal is a bellows seal.

As shown in FIG. 10, a bellows seal 182 may also be employed as the secondary seal 160. The bellows seal 182 includes a bellows 184 coaxial with the central axis 118 and located between the stator holder 146 and the stator bracket 144. The bellows 184 is made of a series of thin walled convolutions that are secured together, usually by welding. Because the bellows 184 is itself flexible in the axial direction, the spring 148 may be omitted from the stator holding assembly 108. The bellows 184 should be designed so that it has a spring constant that is low enough to allow for proper dynamic tracking of the stator 106. A series of radial spring segments 186 are disposed between the outer periphery of the bellows 184 and the stator bracket 144 to act as vibration dampers.

FIGS. 11–15 show diagrammatically how the stator tracks the rotor's motion during operation. It should be understood that the relative dimensions of the motions of the rotor 104 and stator 106 in FIGS. 11–15 are exaggerated for purposes of demonstration. It should also be understood that the rotor 104 and stator 106 bend slightly as they deform, becoming curved in the radial direction to some extent.

Figure 11:
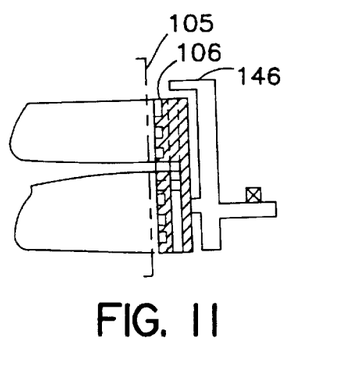
FIGS. 11–15 are diagrammatical side views of the pressures acting on the stator sealing face in various orientations.

FIG. 11 shows the rotor sealing face 105 and the stator sealing face 120 in a parallel orientation. In this orientation, the portion of the stator 106 shown in FIG. 11 experiences a net moment of zero. (It may be useful to refer back to FIG. 5 for a reminder of the pressures and forces acting on the stator 106). As the rotor 104 rotates, the grooves 122 and 124 in the stator 106 pump fluid inwardly to form the film between the rotor sealing face 105 and the stator sealing face 120. It should be understood that, even when the rotor 104 is not rotating, a smaller amount of fluid flows between the rotor 104 and stator 106 forming a face seal and precluding contact. For the 9.6 inch stator, the expected film thickness is about 0.000225 inches for an $P_{system}$ of 250 Psia, with a temperature of 1000° F., and the film stiffness would be about 8lbf/µinch.

Figure 12:
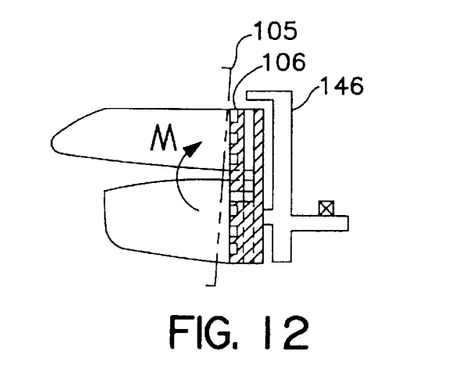

If the rotor face 105 begins to negatively cone, as shown in FIG. 12, the pressure generated by the upper set of grooves will increase, and the pressure generated by the lower set of grooves will decrease. Thus, an additional left-to-right (as shown in FIG. 12) force is active on the radially outer portion of the stator 106, and an additional right-to-left force is active on the radially inner potion of the stator. These twisting forces are located substantially (within 5 to 10 mils) at the centers of pressure of the first and second pressure distributions, and they create a net clockwise bending moment tending to twist the rotor to the position shown in FIG. 13. It should be understood that the positions of the rotor 104 and stator 106 are exaggerated, and that, under normal operation, the outer diameter of the stator should not contact the stator holder 146.

Because two separate sets of grooves are provided generating two separate forces centered substantially at the centers of pressure of the two separate pressure distributions, the twisting moment generated may be up to 100 times greater than that generated by a similarly sized stator having only a single set of grooves. This is true because, in a single groove design, only one pressure distribution is created on the stator sealing face. Any change in rotor position generates a force located substantially (within 5 to 10 mils) at the center of pressure. Therefore, the single groove design moment arm would be in the range of 0.005 to 0.010 inches, rather than the about 0.50 inches provided by the 9.6 inch stator discussed above.

Figure 13:
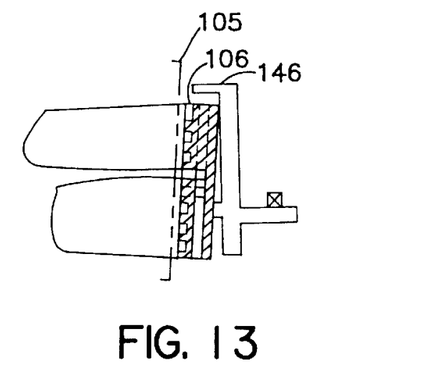
Figure 14:
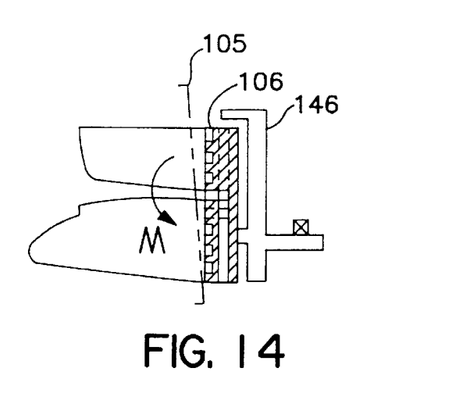
Figure 15:
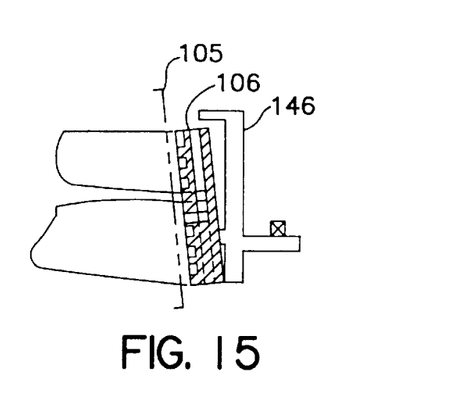

Similarly, if a portion of the rotor face 105 positively cones as shown in FIGS. 14, twisting forces and a twisting moment will be generated to move the stator to the position shown in FIG. 15. When the rotor face 105 returns to the position of FIG. 11 from the positions of FIGS. 13 and 15, forces and moments opposite those described above act on the stator 106 to return it to the position of FIG. 11. It should be understood that the positions of the rotor sealing face 105 and the stator 106 in FIGS. 12 and 14 are used for illustration only, and that the movement of these elements from the positions of FIG. 11 to and from the positions of FIGS. 13 and 15 are made substantially continuously, rather than in two discrete steps.

Figure 16:
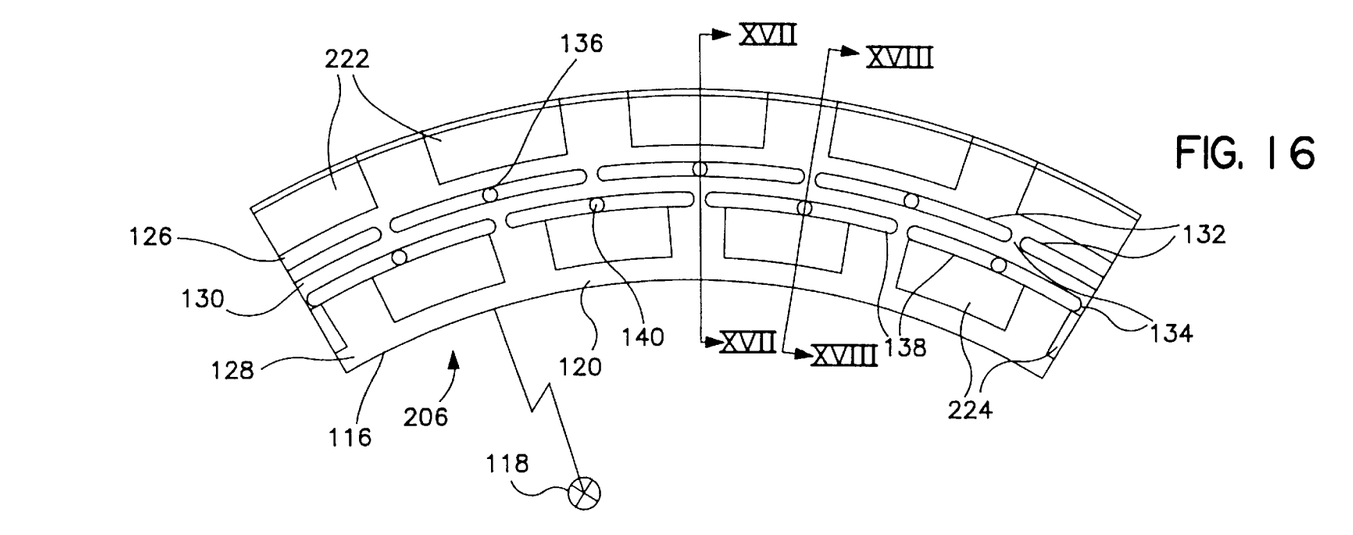
FIG. 16 is a partial front view of a sealing face of a stator according to a second embodiment of the invention, suitable for use in the seal assembly of FIG. 1.
Figure 17:
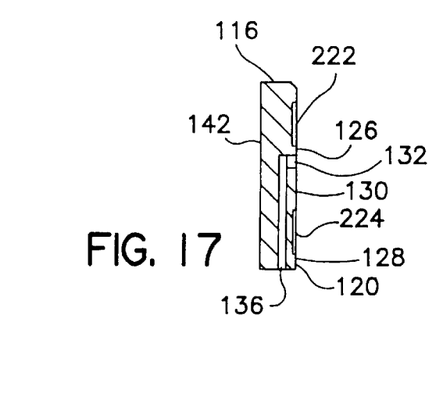
FIG. 17 is a sectional view of the stator taken along line XVII—XVII of FIG. 16.
Figure 18:
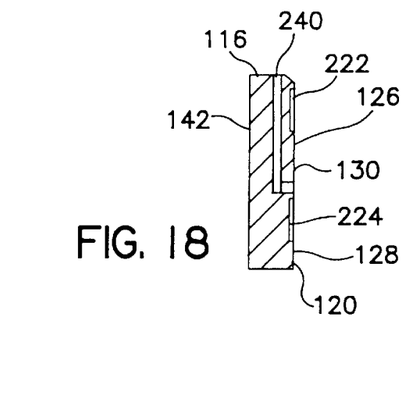
FIG. 18 is a sectional view of the stator taken along line XVIII—XVIII of FIG. 16.

A second embodiment of the stator 206 is shown in FIGS. 16–18. This embodiment of the stator 206 is identical to the first embodiment of the stator 106, except for two changes. First, as shown in FIG. 14, the first and second sets of grooves 222 and 224 are radially extending grooves, rather than spirally extending grooves. A radial groove design may be desirable over a spiral groove design if bi-directional rotation of the rotor is required. A disadvantage of the radial groove design is that it provides less film stiffness than the spiral groove design.

Applicants envision that a 9.6 inch outer diameter radially grooved stator would include 24 grooves in each set of grooves. The radial grooves may have to be made slightly (0.00005–0.0001 inches) deeper than would be spiral grooves on the same stator for optimal operation.

A second difference between the second embodiment of the stator 206 and the first embodiment is shown in FIG. 18. In the second embodiment, the feed conduits 240 extend radially to an outer diameter of the annular member 116 to communicate with the high pressure region 112, rather than extending straight through the annular member. This feature is optional and may be also used with the first stator 106. The feed conduit design of the first embodiment can be used if cooling the annular member 116 with fluid flow along the lapped static sealing face 142 is desired. If such cooling is not a concern, the design of the second embodiment may be used.

FIG. 19 shows an alternate seal assembly 300 in which the rotor 304 is a separate element mounted on a rotating piece of machinery, rather than being an integral element of the machinery itself, as in FIG. 1. The device of FIG. 19 is used on a slower rotating location than the device of FIG. 1. Use of such a separate rotor 304, where possible, beneficially provides more control over the coning and deflection of the rotor.

The invention in its broader aspects is not limited to the specific details, representative devices, and illustrative examples shown and described. Accordingly, departures may be made from such details without departing from the spirit or scope of the general inventive concept as defined by the appended claims and their equivalents.

What is claimed is:

1. A rotary seal assembly for preventing leakage of a fluid from a region of high pressure in a housing to a region of relatively lower pressure, the assembly comprising:

a first member mounted within the housing and having a central axis and an annular sealing face extending in a direction substantially radial to the central axis;

a second member located in the housing and having an annular sealing face extending in the direction substantially radial to the central axis and opposing the first member sealing face, the second member sealing face having a first set of grooves and a second set of grooves arranged circularly thereabout, the second set of grooves being spaced radially inward of the first set of grooves, one of the first and second members being a rotor and the other being a stator, the rotor being rotatable about the central axis, each of the grooves within the first set of grooves and the second set of grooves extending in the same direction spirally about the central axis so that the first set of grooves and the second set of grooves pump fluid in the same radial direction during rotation of the rotor with respect to the stator; and a stator holding assembly supporting the stator within the housing, the stator holding assembly securing the stator against rotation and urging the stator sealing face toward the rotor sealing face, pressurized fluid flowing between the sealing faces and within the first and second set of grooves, thereby forming a gas film seal between the sealing faces.

2. A seal assembly as in claim 1, wherein the second member sealing face further includes a first dam region located radially inward of the first set of grooves and a second dam region located radially inward of the second set of grooves.

3. A seal assembly as in claim 1, wherein the second member sealing face further includes a fluid drain located radially inward of the first set of grooves for draining fluid from between the sealing faces.

4. A seal assembly as in claim 3, wherein the fluid drain includes a plurality of arcuate pockets formed in the second member sealing face, and the second member further includes a plurality of drain conduits formed through the second member and extending from the arcuate pockets to the lower pressure region, each pocket communicating with the low pressure region via a corresponding one of the drain conduits.

5. A seal assembly as in claim 1, wherein the second member sealing face further includes a fluid feed located radially inward of the first set of grooves for feeding fluid to between the sealing faces.

6. A seal assembly as in claim 5, wherein the fluid feed includes a plurality of arcuate pockets formed in the second member sealing face, and the second member further includes a plurality of feed conduits formed through the second member and extending from the arcuate pockets to the high pressure region, each pocket communicating with the high pressure region via a corresponding one of the feed conduits.

7. A seal assembly as in claim 1, wherein the second member sealing face further includes a fluid drain located radially inward of the first set of grooves for draining fluid from between the sealing faces, a fluid feed located radially inward of the fluid drain for feeding fluid to between the sealing faces, and a dam region located on the second member sealing face between the fluid drain and the fluid feed.

8. A seal assembly as in claim 1, wherein the stator has a lapped static sealing face opposite the stator sealing face and the stator holder has a first surface opposing the lapped static sealing face and at least one protrusion extending from the first surface contacting the lapped static sealing face and providing a lapped face seal therebetween.

9. A seal assembly as in claim 8, wherein the protrusion is an annular ridge.

10. A seal assembly as in claim 9, wherein the annular ridge has a lapped face that contacts the stator.

11. A seal assembly for preventing leakage of a fluid from a region of high pressure in a housing to a region of relatively lower pressure, the assembly comprising:

a first member mounted within the housing and having a central axis and an annular sealing face extending in a direction substantially radial to the central axis;

a second member located in the housing and having an annular sealing face extending in the direction substantially radial to the central axis and opposing the first member sealing face, the second member sealing face having a first set of grooves and a second set of grooves arranged circularly thereabout, the second set of grooves being spaced radially inward of the first set of grooves, one of the first and second members being a rotor and the other being a stator, the rotor being rotatable about the central axis, each of the grooves within the first set of grooves and the second set of grooves extending in the same direction spirally about the central axis so that the first set of grooves and the second set of grooves pump fluid in the same radial direction during rotation of the rotor with respect to the stator; and a stator holding assembly supporting the stator within the housing, the stator holding assembly including a stator bracket fixedly secured to the housing and a stator holder slidably secured to the stator bracket, the stator holder being slidable in the direction of the central axis, the stator holding assembly securing the stator against rotation and urging the stator sealing face toward the rotor sealing face, pressurized fluid flowing between the sealing faces and within the first and second set of grooves, thereby forming a gas film seal between the sealing faces.

12. A seal assembly as in claim 11, wherein the stator holding assembly includes a spring disposed between the stator bracket and the stator holder for urging the stator sealing face toward the rotor sealing face.

13. A seal assembly as in claim 12, wherein the spring is a coil spring.

14. A seal assembly as in claim 12, wherein the spring is a wave spring.

15. A seal assembly as in claim 11, wherein the stator holding assembly includes a secondary seal for preventing leakage from the high pressure region to the lower pressure region.

16. A seal assembly as in claim 15, wherein the secondary seal includes a piston ring coaxial with the central axis and located between the stator holder and the stator bracket.

17. A seal assembly as in claim 16, wherein the piston ring includes at least one slot extending partially therethrough in the radial direction.

18. A seal assembly as in claim 17, wherein the piston ring includes at least one set of slots extending partially therethrough in the radial direction.

19. A seal assembly as in claim 17, wherein the piston ring includes a plurality of sets of slots extending partially therethrough in the radial direction.

20. A seal assembly as in claim 17, wherein the piston ring includes a single slot extending entirely therethrough in the radial direction.

21. A seal assembly as in claim 15, wherein the secondary seal includes a brush seal coaxial with the central axis and located between the stator holder and the stator bracket.

22. A seal assembly as in claim 21, wherein the brush seal includes a plurality of bristles mounted between two annular members, the bristles extending in a direction offset from the radial direction.

23. A seal assembly as in claim 15, wherein the secondary seal includes a bellows coaxial with the central axis and located between the stator holder and the stator bracket.

24. A seal assembly for preventing leakage of a fluid from a region of high pressure in a housing to a region of relatively lower pressure, the assembly comprising:

a first member mounted within the housing and having a central axis and an annular sealing face extending in a direction substantially radial to the central axis;

a second member located in the housing and having an annular sealing face extending in the direction substantially radial to the central axis and opposing the first member sealing face, the second member sealing face having a first set of grooves and a second set of grooves arranged circularly thereabout, the second set of grooves being spaced radially inward of the first set of grooves, one of the first and second members being a rotor and the other being a stator, the rotor being rotatable about the central axis, each of the grooves within the first set of grooves and the second set of grooves extending along respective radial lines extending from the central axis; and a stator holding assembly supporting the stator within the housing, the stator holding assembly including a stator bracket fixedly secured to the housing and a stator holder slidably secured to the stator bracket, the stator holder being slidable in the direction of the central axis, the stator holding assembly securing the stator against rotation and urging the stator sealing face toward the rotor sealing face, pressurized fluid flowing between the sealing faces and within the first and second set of grooves, thereby forming a gas film seal between the sealing faces.

25. A stator for use in a rotary seal assembly, the stator comprising:

an annular member defining a central axis;

a sealing face located on the annular member and extending in a direction substantially radial to the central axis;

a first set of grooves arranged circularly about the sealing face;

a second set of grooves arranged circularly about the sealing face and spaced radially inward of the first set of grooves, each of the grooves within the first set of grooves and the second set of grooves extending in the same direction spirally about the central axis so that the first set of grooves and the second set of grooves pump fluid in the same radial direction when the sealing face faces a rotating surface;

a first dam region located on the sealing face radially inward of the first set of grooves; and a second dam region located on the sealing face radially inward of the second set of grooves.

26. A stator as in claim 25, further including a fluid drain and a fluid feed communicating with the sealing face radially inward of the first set of grooves.

27. A stator as in claim 26, wherein the fluid drain includes a plurality of arcuate pockets formed in the stator sealing face, and the stator further includes a plurality of drain conduits, each drain conduit extending from a corresponding pocket through the annular member.

28. A stator as in claim 26, wherein the fluid feed includes a plurality of arcuate pockets formed in the stator sealing face, and the stator further includes a plurality of feed conduits, each feed conduit extending from a corresponding pocket through the annular member.

29. A stator as in claim 25, wherein the annular member includes a radially inner surface, a radially outer surface, at least one passage extending from the radially outer surface through the annular member to the sealing face, and at least one passage extending from the sealing face through the annular member to the radially inner surface.

30. A stator as in claim 25, wherein the annular member includes an extending surface opposite the sealing face, a radially inner surface, at least one passage extending from the extending surface through the annular member to the sealing face, and at least one passage extending from the sealing face through the annular member to the radially inner surface.

31. A stator for use in a rotary seal assembly, the stator comprising:

an annular member defining a central axis;

a sealing face located on the annular member and extending in a direction substantially radial to the central axis;

a first set of grooves arranged circularly about the sealing face; and a second set of grooves arranged circularly about the sealing face and spaced radially inward of the first set of grooves, each of the grooves within the first set of grooves and the second set of grooves extending along respective radial lines extending from the central axis.

32. A rotary seal assembly for preventing leakage of a fluid from a region of high pressure in a housing to a region of relatively lower pressure, the assembly comprising:

a first member mounted within the housing and having a central axis and an annular sealing face extending in a direction substantially radial to the central axis;

a second member located in the housing and having an annular sealing face extending in the direction substantially radial to the central axis and opposing the first member sealing face, the second member sealing face having a first set of grooves and a second set of grooves arranged circularly thereabout, the second set of grooves being spaced radially inward of the first set of grooves, one of the first and second members being a rotor and the other being a stator, the rotor being rotatable about the central axis, each of the grooves within the first set of grooves and the second set of grooves extending along respective radial lines extending from the central axis; and a stator holding assembly supporting the stator within the housing, the stator holding assembly securing the stator against rotation and urging the stator sealing face toward the rotor sealing face, pressurized fluid flowing between the sealing faces and within the first and second set of grooves, thereby forming a gas film seal between the sealing faces.

33. A rotary seal assembly for preventing leakage of a fluid from a region of high pressure in a housing to a region of relatively lower pressure, the assembly comprising:

a rotor mounted within the housing for rotation about a central axis and having an annular sealing face extending in a direction substantially radial to the central axis;

a stator located in the housing, the stator having first conduits formed through the stator and communicating with the lower pressure region, second conduits formed through the stator and communicating with the high pressure region, and an annular sealing face extending in a direction substantially radial to the central axis and opposing the rotor sealing face, the stator sealing face having a first set of grooves arranged circularly thereabout, a first dam region located radially inward of the first set of grooves, fluid drain pockets located radially inward of the first dam region and communicating with the first conduits to drain fluid from between the sealing faces to the lower pressure region, a center dam region located radially inward of the fluid drain pockets, fluid feed pockets located radially inward of the center dam region and communicating with the second conduits to feed fluid from the high pressure region to between the sealing faces, a second set of grooves located radially inward of the center dam region, and a second dam region located radially inward of the second set of grooves, pressurized fluid flowing between the sealing faces to form a gas film seal between the sealing faces.

* * * * *